FREQUENCY MODULATION COMMUNICATION SYSTEM

Filed Oct. 20, 1953 4 Sheets-Sheet 1

INVENTOR
MURRAY G. CROSBY
BY James and Franklin
ATTORNEYS

Dec. 15, 1959 M. G. CROSBY 2,917,623

FREQUENCY MODULATION COMMUNICATION SYSTEM

Filed Oct. 20, 1953 4 Sheets-Sheet 2

INVENTOR
MURRAY G. CROSBY
BY James and Franklin
ATTORNEYS

Dec. 15, 1959 M. G. CROSBY 2,917,623

FREQUENCY MODULATION COMMUNICATION SYSTEM

Filed Oct. 20, 1953 4 Sheets-Sheet 3

INVENTOR
MURRAY G. CROSBY
BY James and Franklin
ATTORNEYS

INVENTOR
MURRAY G. CROSBY
BY James and Franklin
ATTORNEYS

United States Patent Office 2,917,623

Patented Dec. 15, 1959

2,917,623

FREQUENCY MODULATION COMMUNICATION SYSTEM

Murray G. Crosby, Riverhead, N.Y.

Application October 20, 1953, Serial No. 387,292

6 Claims. (Cl. 250—6)

This invention relates to communication systems, especially frequency modulation systems carrying multiple message channels, and more especially for binaural sound transmission.

It has already been proposed to provide multiplex communication by using a main carrier and one or more subcarriers in a frequency modulation system. Such systems have the disadvantage that a subcarrier gives a much poorer signal-to-noise ratio than the main channel. The primary object of the present invention is to provide a multiple channel frequency modulation system in which all of the channels have substantially equal, and also a good signal-to-noise ratio.

A more particular object of this invention is to improve the signal-to-noise ratio obtained on the two channels of a binaural sound system. A further object is to provide a means of applying binaural sound transmission to a monaural system in a "compatible" manner such as to avoid impairment of the monaural reception.

In the prior art of such binaural sound transmission, various systems have been proposed which usually resulted in two transmission channels of unequal signal-to-noise ratio. An example of such application is the use of the AM channel of a standard broadcast transmitter for one channel of the system, and an FM broadcast transmitter for the other channel. Such a system provides an inferior signal-to-noise ratio from the channel which is transmitted by means of the standard amplitude modulation broadcast system. Another example of such binaural transmission is by the use of subcarrier modulation applied to an FM transmitter. This system also results in a poorer signal-to-noise ratio transmitted on the subcarrier channel than is transmitted on the main program channel.

My copending application, Serial No. 350,164 filed April 21, 1953, Patent No. 2,851,532, describes a method of equalizing the signal-to-noise ratio on the two channels in a manner that improves the poorer channel by at least say 6 db for the case of the FM subcarrier type of binaural transmission. The system of the present invention provides this same equality of signal-to-noise ratio on both channels, but does so at a much greater transmission efficiency than the prior systems.

In the case of the subcarrier FM type of transmission, the signal-to-noise ratio on the subcarrier channel limits the maximum range of transmission. I have found by measurement that the signal-to-noise ratio on the subcarrier channel may be from 20 to 30 db poorer than that on the main program channel. It is obvious that it would be highly desirable to obtain two channels with a signal-to-noise ratio equal to that obtained on the main program channel. This invention describes such a system.

In operation, the system transmits a dual-channel frequency modulated wave which comprises two frequency-modulated waves separately modulated by the two microphones of the binaural system. These waves are transmitted together from the same transmitter, and received on a common receiver, and are demodulated in various combinations to produce the separate speaker outputs corresponding to the separate microphone transmissions.

To accomplish the foregoing general objects, and such other objects as will hereinafter appear, my invention resides in the multiple channel frequency modulation communication system elements, and their relation one to another, as are hereinafter more specifically described in the following specification. The specification is accompanied by drawings, in which:

Fig. 3 is a block diagram for a twin channel receiver adapted to receive the transmission from the transmitter of Fig. 1;

Figure 1:
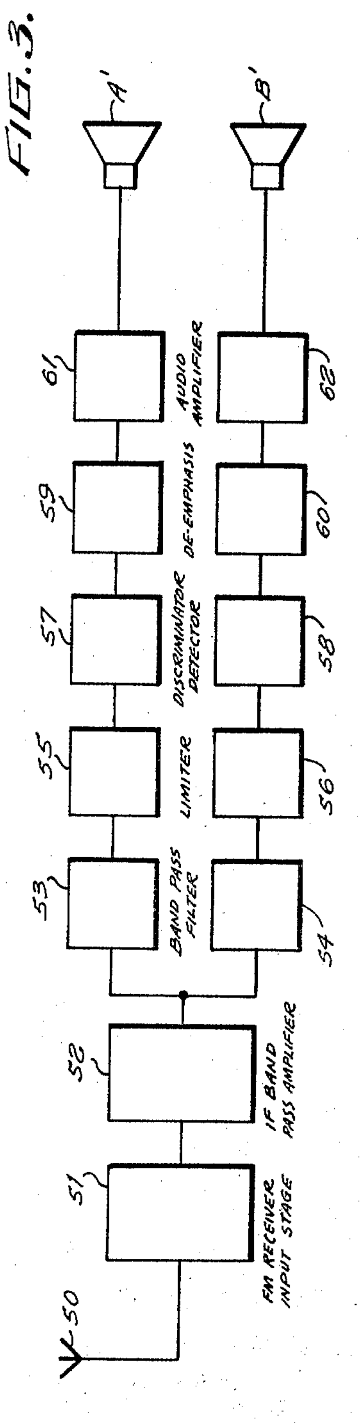
Fig. 1 is a schematic block diagram for a twin channel frequency modulation transmitter embodying features of my invention.
Figure 1:
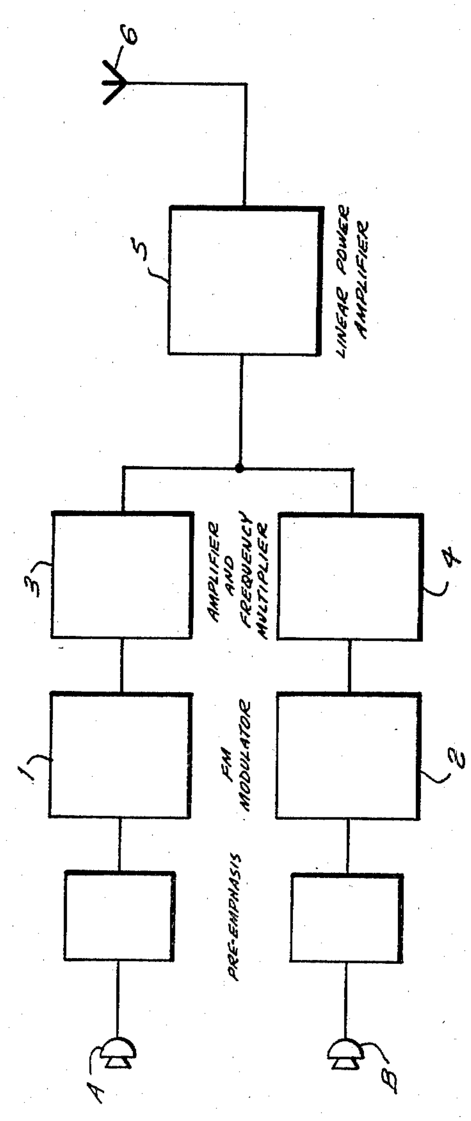

Referring to the drawings, a transmitter for twin channel FM binaural transmission is shown in Fig. 1. Microphone A feeds an FM modulator 1, and microphone B feeds an FM modulator 2. The resulting two frequency modulated waves are approximately equally amplified and frequency multiplied in units 3 and 4, and are combined at the input of a single linear power amplifier 5. The amplification in the power amplifier must be linear, like that of a single-sideband type of transmitter, so that cross modulation components between the two waves will not be introduced. The composite wave is radiated on an antenna 6. If desired, the FM modulators 1 and 2 may be preceded, as shown, by similar pre-emphasis networks of conventional type. In general, the system is symmetrical, as shown, so that both messages undergo equal transmissions.

Figures 2, 3A, 4:
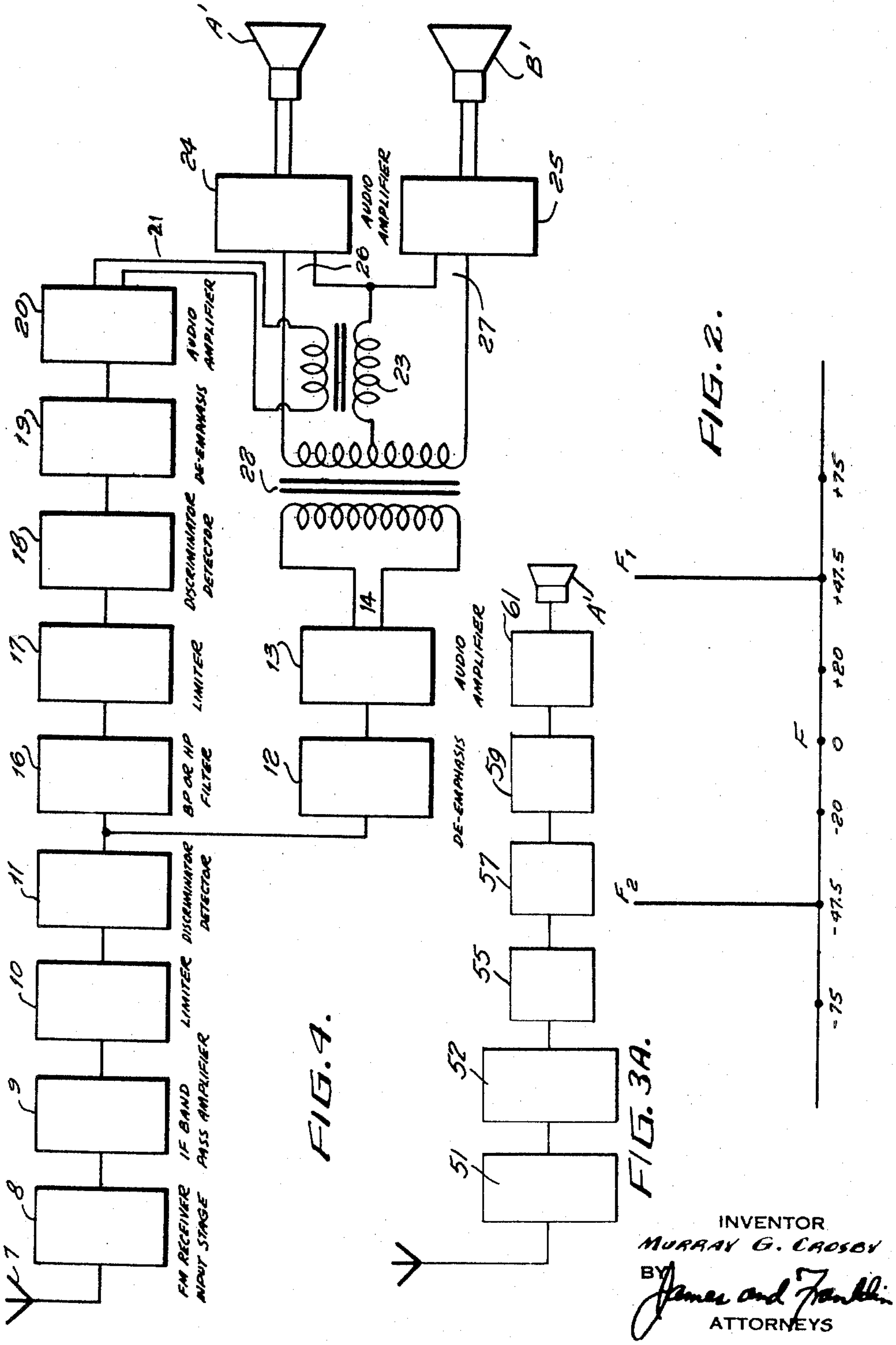
Fig. 2 is a diagram explanatory of the frequency distribution in the transmitter shown in Fig. 1.
Fig. 3A is a block diagram for a monaural receiver adapted to receive the transmission from the transmitter of Fig. 1.
Fig. 4 is a block diagram for a modified receiver.

Fig. 2 shows a typical usable frequency disposition, which is based on the present standard frequency-modulation bandwidth arrangement, in which a peak frequency deviation of 75 kc. is allowed. Frequency F indicates the normal unmodulated carrier frequency allocated to the frequency-modulation transmitter 5. No power is radiated at this allocated frequency F. Instead, the two frequency modulated waves from units 1, 3 and 2, 4 are displaced from the carrier frequency to frequencies F1 and F2. The object is to locate these two frequencies sufficiently far from the assigned carrier frequency F so that, when frequency modulation is applied, the excursions will not go any closer than plus or minus 20 kc. from the assigned carrier frequency, and will not go outside of the allowable range of plus or minus 75 kc. This results in an unmodulated carrier frequency for these two waves one of which is plus 47.5 kc. and the other of which is minus 47.5 kc. from the assigned carrier frequency F.

Fig. 3 shows a symmetrical receiving system for use with the transmitter of Fig. 1. In this system, separate limiters and discriminators are used for each frequency-modulated wave. This system is most advantageous with respect to signal-to-noise ratio. This advantage results because of the limitation of cancellation effects which introduce noise during the interval of cancellation of amplitude of the two frequency-modulated waves. The wave is received on an antenna 50, and is converted to intermediate frequency in unit 51, which may have the usual tuned radio frequency amplifier and local oscillator and first detector. Bandpass IF amplifier 52 provides a partial selection which selects and accepts both of the resulting frequency modulated waves, and which may correspond to the outputs of the FM modulators 1 and 2 in Fig. 1.

Filters 53 and 54 separately select the individual frequency-modulated waves, and apply them to limiters 55 and 56. These filters 53 and 54 do not need to be highly selective, since cross modulation between the two waves is reduced by the frequency-modulation "capture effect" which allows the frequency-modulation system to favor the strongest signal being received. The limiters are followed by the FM discriminator and detector systems 57 and 58. The discriminator detectors may be of the Seeley type which is described more fully in U.S. Patent No. 2,121,103 issued June 21, 1938. De-emphasis is applied in networks 59 and 60, if pre-emphasis is used in the transmitter. Audio amplifiers 61 and 62 present the output transmitted from the two microphones to the two spaced speakers A′ and B′.

The binaural system of Figs. 1, 2 and 3 has an advantage which may be referred to as "compatibility." More specifically, ordinary FM receivers may be used to receive the transmission from the twin channel transmitter of Fig. 1 without any sacrifice of quality, because such a receiver will be tuned to the frequency F between the two frequencies of the twin channel receiver, and will receive the sum of the output of both microphones, which is in contrast with the usual binaural systems in which an ordinary FM receiver would receive the output of only one of the two microphones. The monaural receiver would employ the units 51 and 52 of Fig. 3, followed by one of the two limiters 55 and 56, followed by one of the two discriminators 57 and 58, followed by one of the two de-emphasis networks 59 and 60, followed by one of the two audio frequency amplifiers 61 and 62, which in turn would drive a loudspeaker. The audio frequency wave fed to the loudspeaker would be a combination of the waves from both microphones. This is illustrated by the block diagram shown in Fig. 3A.

The twin channel system of Figs. 1, 2 and 3 is better than one using a main channel and a subcarrier channel as heretofore proposed. In general a subcarrier system gives poorer and poorer signal-to-noise ratio as one adds subcarriers. The transmitter of Fig. 1 does not have this difficulty. The frequency modulation equipment may be standard all the way up to the power amplifier 5. In an ordinary FM system the amplifier would then be operated in Class C or saturated, but in my present transmitter the power amplifier is operated as a Class B or a Class AB amplifier, in order to secure the desired linear operation over the transmitted frequency range.

Fig. 4 shows another embodiment of a receiving system for this special type of twin frequency-modulated wave. The wave received on antenna 7 is converted to intermediate frequency in unit 8, which may comprise the usual radio-frequency amplifier, local oscillator, and first detector. The intermediate frequency wave is then selected from the signals of other stations by means of an IF bandpass amplifier 9. Any amplitude modulation present is removed by a limiter 10. Frequency-modulation discriminator and detector 11 is of the normal width used in standard frequency modulation, and will accommodate a deviation of plus or minus 75 kc. Common practice is to design this discriminator considerably wider than the deviation of plus or minus 75 kc. in order to obtain good linearity on the portion of the characteristic used.

The detected output from the discriminator and detector units 11 will comprise the detection of both frequency modulated waves F1 and F2 for the sum of the modulations from the two microphones A and B, which I may designate as $(A+B)$. The usual de-emphasis is applied in network 12 to compensate for the pre-emphasis applied at the FM modulators of the transmitter. Audio amplifier 13 accepts the audio but is a high impendance to a frequency such as $F1-F2$. Amplifier 13 provides the $(A+B)$ output at terminals 14.

Units 16, 17, 18, 19 and 20 comprise a subcarrier detector system which detects the difference frequency between the radio frequencies F2 and F1. For the example of Fig. 2, this subcarrier will be 95 kc. in the absence of modulation, and will modulate between limits of approximately 40 kc. and 150 kc. The exact limits will depend upon the amount of frequency deviation applied by each FM modulator, but for the case shown in Fig. 2 it might be a deviation of approximately 20 to 25 kc. The frequency range of bandpass or highpass filter 16 should cover the range of frequency deviation of the difference subcarrier or from 40 kc. to 150 kc. It rejects audio frequency, and the frequencies F1, and F2, and $F1+F2$, are completely out of range. It may most conveniently be a simple highpass filter cutting off at between 20 kc. and 40 kc. Limiter 17 removes the amplitude modulation from the difference frequency-modulated wave $F1-F2$. Discriminator and detector 18 detects the frequency modulation of the difference beatnote. De-emphasis network 19 applies the usual de-emphasis. Audio amplification is obtained in unit 20, so that the difference output of the two microphones $(A-B)$ is available at lines 21.

Transformers 22 and 23 are connected in the manner more fully discussed in my copending application Serial No. 350,164 mentioned above. The effect of the transformers is such that the sum of the waves $(A+B)$ and $(A-B)$ is obtained at terminals 26 to be applied to amplifier 24, and the difference between the waves $(A+B)$ and $(A-B)$ is obtained at terminals 27 to be applied to amplifier 25. The sum $(A+B)+(A-B)$ results in an output of 2A at speaker A′. The difference $(A+B)-(A-B)$ results in an output of 2B at speaker B′, which is spaced from speaker A′. This is the desired binaural separation of the transmissions from microphone A and B. The speaker A′ responds to microphone A alone, while speaker B′ responds to microphone B alone.

It will be understood that speakers A′ and B′ might also be replaced by headphones, with the message from microphone A connected to the headphone on one ear, and the message from microphone B supplied to the headphone on the other ear. Such a headphone arrangement would give a truer binaural reproduction, but the loudspeaker system would ordinarily be preferred because it gives a stereophonic effect without the inconvenience of wearing headphones. The possible use of headphones applies similarly to the receivers of Fig. 3 and Fig. 5.

One advantage of the system shown in Fig. 4 is that some potential users of the present invention already have regular FM receiving equipment. The system of Fig. 4 permits use of the old equipment for the units marked 8, 9, 10, 11, 12, 13, 24, and A′ for the $(A+B)$ signal. The remaining equipment may be added as additional equipment to reproduce the $(A-B)$ signal. This is in contrast with the receiver of Fig. 3, which may require new equipment.

Another advantage of the receiver of Fig. 4, compared to the receiver of Fig. 3, is that the former is capable of receiving transmission from not only the transmitter of Fig. 1, but also a binaural subcarrier transmitter of the type disclosed in my copending application Serial No. 350,164, filed April 21, 1953.

If the transmission were on a subcarrier system of that type the A plus B combination usually will provide a level of microphone output which is greater than that of the A minus B combination, and in such case the input to the subcarrier generator at the transmitter is preferably increased in level by a factor "K," and a corresponding reduction of level is preferably introduced in the output of the subcarrier receiver. The factor "K" is such that the levels preferably are equalized during transmission. Thus the present receiver would be arranged by means of a changeover switch to lower the output of the subcarrier receiver when receiving such transmission, but not when receiving transmission from transmitters of the type disclosed in the present application.

For this purpose there would be a change in the amount of amplification of the $(A-B)$ channel, and a switch arrangement may be provided making it possible to introduce attenuation by a desired factor "K" when receiving from the transmitter of my copending application aforesaid, and to eliminate the said attenuation when receiving from the twin channel transmitter of Fig. 1 of the present application.

It will be noted that the output from terminals 14, which corresponds to the output from any frequency-modulation receiver not equipped for binaural reception, comprises the summation output $(A+B)$. This is the desired condition for the reception of monaural sound, since it gives the best balance obtainable when two microphones are used in binaural transmission. If the reception were from one microphone only, the balance might be poor for the condition of a relatively large separation of microphones. Also, if the reception happens to be the difference output from the two microphones, cancellation effects occur when the sound source is directly between the two microphones.

Figure 5:
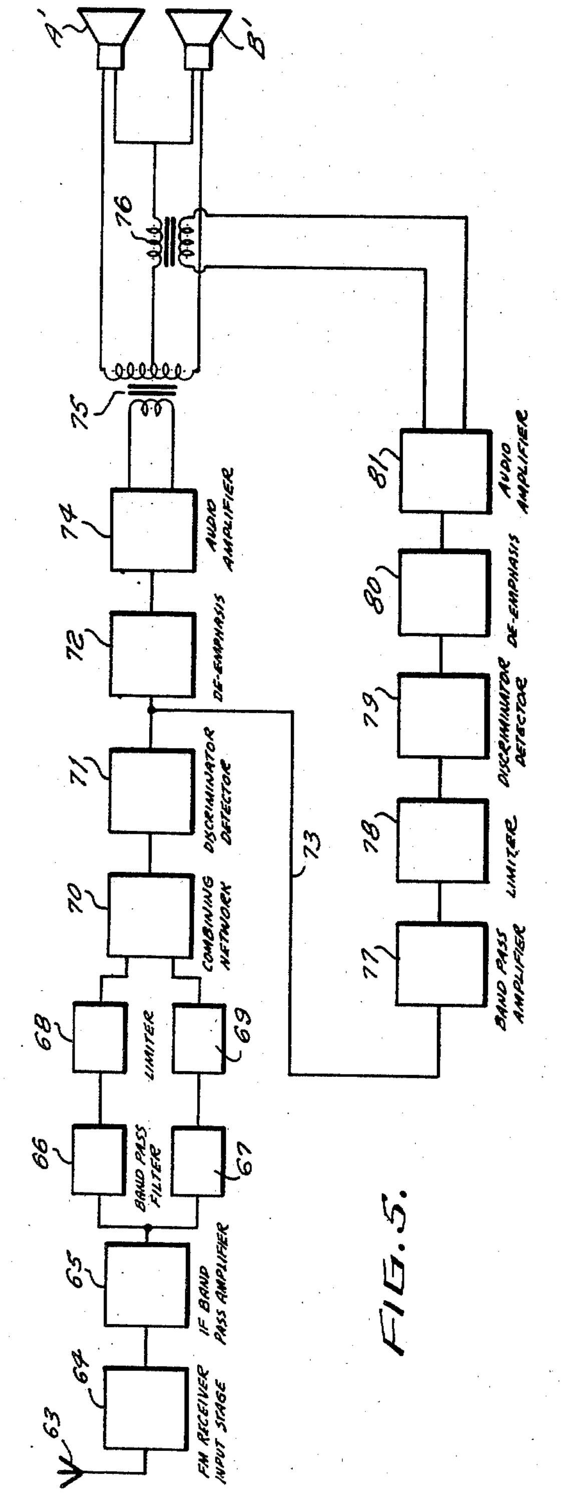
Fig. 5 is a block diagram for still another receiver.

Fig. 5 shows another alternative receiver circuit in which the same elements are used as were used in Fig. 3 up to the limiter elements 68 and 69. At the output of these two limiters 68 and 69, the wave is combined into one channel in a combining network 70, and is applied to an FM discriminator and detector 71 for discrimination and detection. The output of detector 71 comprises the $(A+B)$ combination, in the same manner as that obtained in the common-limiter system of Fig. 4. The rest of the system is the same as that shown in Fig. 4. The summation output $(A+B)$ appears at the output of audio amplifier 74, and a difference output $(A-B)$ appears at the output of audio amplifier 81. Transformers 75 and 76 separate the A and B components for translation in the speakers A′ and B′, by algebraic addition and subtraction, as previously explained, and as set forth also in my copending application Serial No. 350,164.

The advantage of the receiver shown in Fig. 5 is that it has a better signal-to-noise ratio than the receiver of Fig. 4. The improvement in the case of the circuit of Fig. 5 results mainly from the elimination of a common limiter for the two waves. With a common limiter there are periods of complete cancellation of one wave by the other during which the limiter output is mainly noise. This makes the signal-to-noise ratio of the individual waves somewhat poorer than that which is obtained by the use of separate limiting as in Figs. 3 and 5. Additional small improvement results from the use of the filters 66 and 67. These are narrower bandpass filters than the filter 9 of Fig. 4, and therefore a better signal-to-noise ratio is obtained.

The system of the present invention is not necessarily limited to the use of two channels. There could be three channels for trinaural sound reproduction, or other purpose, or even more channels than three. Three channels may be used within the present standard frequency modulation bandwidth arrangement, in which a peak frequency deviation of 75 kc. is allowed. One feasible frequency distribution in such case is that shown in Fig. 6, in which one channel will be centered on the mid-frequency F; a second channel on the frequency F1, with a rest position at plus 55 kc.; and the other channel at frequency F2, with a rest position at minus 55 kc.

However, the merit of the system is not limited to such a predetermined standard peak frequency deviation as is permitted in broadcasting. The multiple channel arrangement may be used for closed circuit theatre television using multiple speakers. Three or more speakers may be used for such systems, and with a closed channel for theatre purposes the permissible frequency deviation may be made much wider, thereby more readily accommodating a greater number of channels.

Figure 6:
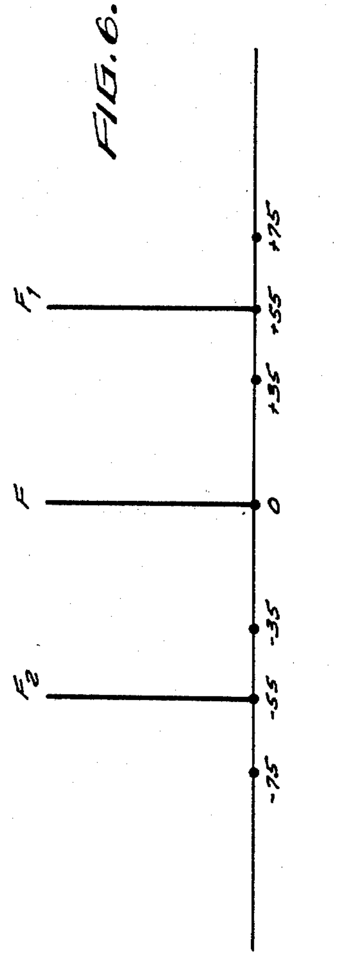
Fig. 6 is a diagram explanatory of one example of frequency distribution which may be used in a three channel transmitter.
Figure 7:
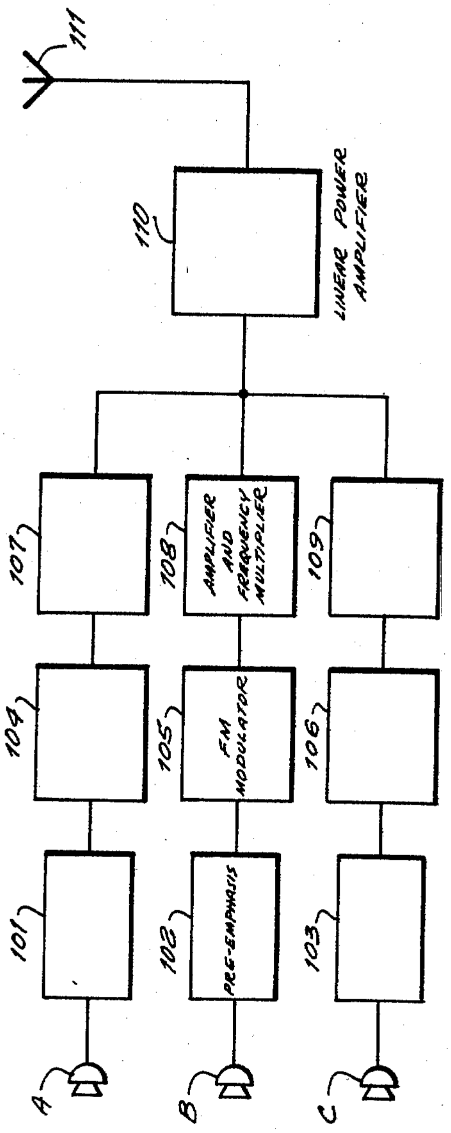
Fig. 7 is a block diagram based on the circuit of Fig. 1, but showing the invention applied to a transmitter having more than two channels.

Fig. 7 illustrates a transmitter for transmitting three messages in accordance with the principles outlined in the above discussion of Fig. 6. As here illustrated, the transmitter is used for trinaural sound. It will be seen that the microphones A, B and C have their outputs fed through generally similar pre-emphasis units 101, 102, and 103, which are optional but customary in frequency modulation work. The message or sound is then applied to generally similar frequency modulated oscillators 104, 105, and 106 having a frequency centering about one or another of three rest frequencies, which rest frequencies are sub-multiples of the three ultimate rest frequencies, such as those indicated in Fig. 6, and there designated F, F1 and F2. The frequency modulated waves are then fed through generally similar frequency multipliers 107, 108, and 109, which act also as amplifiers, and which bring the frequency up to one or another of the aforesaid frequencies F, F1 and F2. All three messages are approximately equally amplified, or, in other words, undergo equal transmissions. All three frequency modulated waves are then fed in common to a single power amplifier 110 of linear characteristic, the output of which is radiated by means of a suitable antenna system 111. It will be understood that a closed circuit or high frequency transmission line such as a coaxial cable may be used. In general the transmitter is like that shown in Fig. 1, except that there are three channels (and there may be more) instead of two channels.

Figure 8:
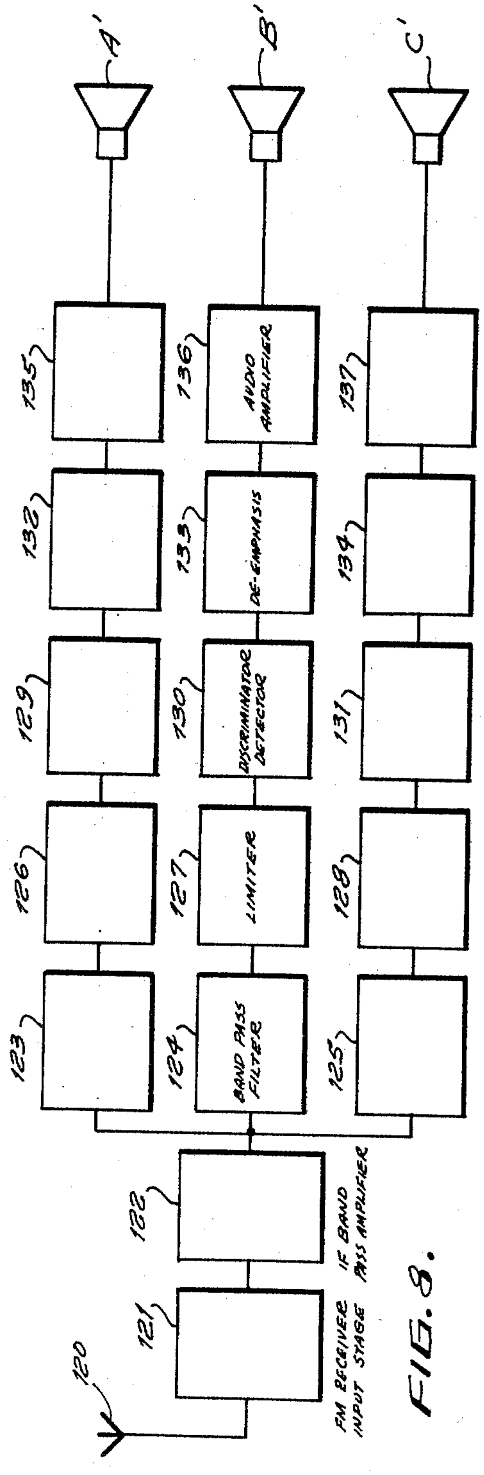
Fig. 8 is a block diagram based on that shown in Fig. 3, but showing the invention applied to a receiver having more than two channels.

Similarly, the receiver of Fig. 8 is like the receiver of Fig. 3, except that there are three (and there may be more) channels instead of two. This will be evident from the block diagram in which the blocks or rectangles shown, correspond to those in Fig. 3.

The wave is received on antenna 120 and is converted to intermediate frequency in unit 121 which may have the usual tuned radio frequency amplifier and local oscillator and first detector. A bandpass intermediate frequency amplifier 122 provides a partial selection which selects and accepts the three frequency modulated waves, which may correspond to the outputs of the FM modulators 104, 105 and 106 in Fig. 7. Filters 123, 124 and 125 separately select the individual frequency modulated waves, and apply them to limiters 126, 127 and 128. The filters need not be highly selective, as was previously explained in connection with Fig. 3. The limiters are followed by frequency modulation discriminator and detector systems 129, 130 and 131. De-emphasis is applied in networks 132, 133 and 134, if pre-emphasis was used in the transmitter. Audio amplifiers 135, 136 and 137 amplify the outputs and drive the three translating devices or spaced speakers A′, B′ and C′, which reproduce the pick-up of the three microphones A, B and C shown in Fig. 7. Thus the specific system shown in Figs. 7 and 8 may be used for trinaural transmission and reception.

It is believed that the method and apparatus of my invention, and its underlying principles, as well as the advantages thereof, will be apparent from the foregoing description. It will also be apparent to those skilled in the art that other methods of transmitting the twin-wave frequency modulation may be employed. All of the practices of single-sideband transmission may be applied. For instance, the system described by Leonard R. Kahn in the July issue of Proceedings of I.R.E. entitled "Single-Sideband Transmission by Envelope Elimination and Restoration" may be used if desired. Likewise, the systems of copending applications, Serial Nos. 278,976 and 278,977, entitled "Modulated Wave Amplifier" and "Single-Sideband Modulator," may be used if desired.

It will therefore be apparent that while I have shown and described my invention in several preferred forms, changes may be made in the circuits shown without departing from the scope of the invention, as sought to be defined in the following claims.

I claim:

1. A twin channel frequency modulation stereophonic sound system for operation in an assigned channel having a mid-frequency F and comprising a twin channel transmitter and a twin channel receiver, said transmitter comprising a frequency modulated oscillator for each of two microphone signals, a frequency multiplier for each of the oscillators and a single power amplifier for the outputs of the two multipliers, one transmission channel centering on a frequency F1 which is above the assigned mid-channel frequency F, the other channel centering on a frequency F2 which is below the assigned mid-channel frequency F, the deviations of channels F1 and F2 being limited to an amount not to exceed the allowable limits of frequency for the legally permitted deviation of the assigned channel F, the sum of the deviations of channels F1 and F2 being less than the legally permitted deviation of the assigned channel F, the deviations of channels F1 and F2 being limited not to overlap one another, said power amplifier having a linear characteristic to accommodate the outputs of the two multipliers without substantial cross-modulation, and said receiver comprising an input stage having a local oscillator and detector, an intermediate bandpass amplifier broad enough to pass both channels, two filters connected in parallel to the intermediate frequency amplifier and having a difference in frequency such as to separate the channels, a frequency modulation discriminator and audio frequency amplifier and a loudspeaker for each of the filters for separately reproducing the desired stereophonic sound, the aforesaid system so relating the two microphone signals at the transmitter that a monaural receiver tuned to the assigned mid-channel frequency F will receive and reproduce a signal which additively combines the two microphone signals.

2. A twin channel frequency modulation sound system for operation in an assigned channel having a mid-frequency F and comprising a twin channel transmitter and a single channel receiver, said transmitter comprising a frequency modulated oscillator for each of two microphone signals, a frequency multiplier for each of the oscillators and a single power amplifier for the outputs of the two multipliers, one transmission channel centering on a frequency F1 which is above the assigned mid-channel frequency F, the other channel centering on a frequency F2 which is below the assigned mid-channel frequency F, the deviations of channels F1 and F2 being limited to an amount not to exceed the allowable limits of frequency for the legally permitted deviation of the assigned channel F, the sum of the maximum deviations of channels F1 and F2 being less than the legally permitted deviation of the assigned channel F, the deviations of channels F1 and F2 being limited not to overlap one another, said power amplifier having a linear characteristic to accommodate the outputs of the two multipliers without substantial cross-modulation, and said receiver comprising an input stage having a local oscillator and detector, an intermediate bandpass amplifier broad enough to pass both channels, a frequency modulation discriminator, an audio frequency amplifier and a loudspeaker, said receiver being tuned to the assigned mid-channel frequency F, the system so relating the two microphone signals at the transmitter that said single channel receiver receives and reproduces a signal which additively combines the two microphone signals, the system being such that a stereophonic receiver may be provided with filters for separately reproducing the two microphone signals.

3. A twin channel frequency modulation stereophonic sound system for operation in an assigned channel having a mid-frequency F and comprising a twin channel transmitter and a twin channel receiver, said transmitter comprising a frequency modulated oscillator for each of two microphone signals, a frequency multiplier for each of the oscillators, and a single power amplifier for the outputs of the two multipliers, one transmission centering on a frequency F1 which is above the assigned mid-channel frequency F by an amount somewhat more than half the permissible frequency deviation, the other channel centering on a frequency F2 which is below the assigned mid-channel frequency F by an equal amount, the deviation of channel F1 being limited to an amount not to exceed the allowable upper limit of frequency for the legally permitted deviation of the assigned channel F, the deviation of channel F2 being limited to an amount not to exceed the allowable lower limit of frequency for the legally permitted deviation of the assigned channel F, the sum of the deviations of channels F1 and F2 being less than the legally permitted deviation of the assigned channel F, the deviation of channels F1 and F2 being limited not to overlap one another, and said receiver comprising an input stage having a local oscillator and detector, an intermediate bandpass amplifier broad enough to pass both channels, two filters connected in parallel to the intermediate frequency amplifier and having a difference in frequency such as to separate the channels, a frequency modulation discriminator and an audio frequency amplifier and a loudspeaker for each of the filters for separately reproducing the desired stereophonic sound, the aforesaid system so relating the two microphone signals at the transmitter that a monaural frequency modulation receiver tuned to the assigned mid-channel frequency F will receive and reproduce a signal which additively combines the two microphone signals.

4. A twin channel frequency modulation sound system for operation in an assigned channel having a mid-frequency F and comprising a twin channel transmitter and a single channel receiver, said transmitter comprising a frequency modulated oscillator for each of two microphone signals, a frequency multiplier for each of the oscillators, and a single common power amplifier for the outputs of the two multiplers, one transmission centering on a frequency F1 which is above the assigned mid-channel frequency F by an amount somewhat more than half the permissible frequency deviation, the other channel centering on a frequency F2 which is below the assigned mid-channel frequency F by an equal amount, the deviation of channel F1 being limited to an amount not to exceed the allowable upper limit of frequency for the legally permitted deviation of the assigned channel F, the deviation of channel F2 being limited to an amount not to exceed the allowable lower limit of frequency for the legally permitted deviation of the assigned channel F, the sum of the deviations of channels F1 and F2 being less than the legally permitted deviation of the assigned channel F, the maximum deviation of channels F1 and F2 being limited not to overlap one another, and said receiver comprising an input stage having a local oscillator and detector, an intermediate bandpass amplifier broad enough to pass both channels, a frequency modulation discriminator and an audio frequency amplifier and a loudspeaker, the aforesaid receiver being tuned to the assigned mid-channel frequency F, the system so relating the two microphone signals at the transmitter that said single channel receiver receives and reproduces a signal which additively combines the two microphone signals, the system being such that a stereophonic receiver may be provided with filters for separately reproducing the two microphone signals.

5. A twin channel frequency modulation stereophonic sound system for operation in an assigned channel having a mid-frequency F and comprising a twin channel transmitter and a twin channel receiver, said transmitter comprising a frequency modulated oscillator for each of two microphone signals, a frequency multiplier for each of the oscillators, and a single power amplifier for the outputs of the two multipliers, said oscillator and multiplier resulting in approximately equal transmission of the microphone outputs with one transmission centering on a frequency F1 which is above the assigned mid-channel frequency F by an amount somewhat more than half the permissible frequency deviation, the other channel centering on a frequency F2 which is below the assigned mid-channel frequency F by an equal amount, the deviation of channel F1 being limited to an amount not to exceed the allowable upper limit of frequency for the legally permitted deviation of the assigned channel F, the deviation of channel F2 being limited to an amount not to exceed the allowable lower limit of frequency for the legally permitted deviation of the assigned channel F, the sum of the deviations of channels F1 and F2 being less than the legally permitted deviation of assigned channel F, the deviation of channels F1 and F2 being limited not to overlap one another, said power amplifier having a linear characteristic over a band so broad as to accommodate the outputs of the two multipliers without substantial cross-modulation, and said receiver comprising an input stage having a local oscillator and detector, an intermediate bandpass amplifier broad enough to pass both channels, two filters connected in parallel to the intermediate frequency amplifier and having a difference in frequency such as to separate the channels, a limiter and frequency modulation discriminator and de-emphasis network and an audio frequency amplifier and a loudspeaker for each of the filters for separately reproducing the desired stereophonic sound, the aforesaid system so relating the two microphone signals at the transmitter that a monaural receiver tuned to the assigned mid-channel frequency F will receive and reproduce a signal which additively combines the two microphone signals.

6. A twin channel frequency modulation sound system for operation in an assigned channel having a mid-frequency F and comprising a twin channel transmitter and a single channel receiver, said transmitter comprising a frequency modulated oscillator for each of two microphone signals, a frequency multiplier for each of the oscillators, and a single power amplifier for the outputs of the two multipliers, said oscillator and multiplier resulting in approximately equal transmission of the microphone outputs with one transmission centering on a frequency F1 which is above the assigned mid-channel frequency F by an amount somewhat more than half the permissible frequency deviation, the other channel centering on a frequency F2 which is below the assigned mid-channel frequency F by an equal amount, the deviation of channel F1 being limited to an amount not to exceed the allowable upper limit of frequency for the legally permitted deviation of the assigned channel F, the deviation of channel F2 being limited to an amount not to exceed the allowable lower limit of frequency for the legally permitted deviation of the assigned channel F, the sum of the deviations of channels F1 and F2 being less than the legally permitted deviation of the assigned channel F, the deviation of channels F1 and F2 being limited not to overlap one another, said power amplifier having a linear characteristic over a band so broad as to accommodate the outputs of the two multipliers without substantial cross-modulation, and said receiver comprising an input stage having a local oscillator and detector, an intermediate bandpass amplifier broad enough to pass both channels, a limiter and frequency modulation discriminator and de-emphasis network, an audio frequency amplifier and a loudspeaker, the aforesaid receiver being tuned to the assigned mid-channel frequency F, the system so relating the two microphone signals at the transmitter that said single channel receiver receives and reproduces a signal which additively combines the two microphone signals, the system being such that a stereophonic receiver may be provided with filters for separately reproducing the two microphone signals.

References Cited in the file of this patent

UNITED STATES PATENTS

| | | |
|---|---|---|
| 1,608,566 | Potter | Nov. 30, 1926 |
| 1,641,431 | Horton | Sept. 6, 1927 |
| 1,685,357 | Griggs | Sept. 25, 1928 |
| 2,104,318 | Crosby | Jan. 4, 1938 |
| 2,172,209 | Laub | Sept. 5, 1939 |
| 2,261,628 | Lovell | Nov. 4, 1941 |
| 2,511,204 | Goldstine | June 13, 1950 |
| 2,609,535 | Harmon | Sept. 2, 1952 |
| 2,630,497 | Armstrong | Mar. 3, 1953 |
| 2,654,885 | Wilmotte | Oct. 6, 1953 |
| 2,675,540 | Schultheis | Apr. 13, 1954 |

OTHER REFERENCES

TV & Radio Engineering, Aug.-Sept. 1953 "Binaural Sound on One FM Channel" by Crosby.